Sept. 22, 1936.          J. H. JACOBS          2,055,012
WIND ELECTRIC PLANT
Filed July 12, 1935
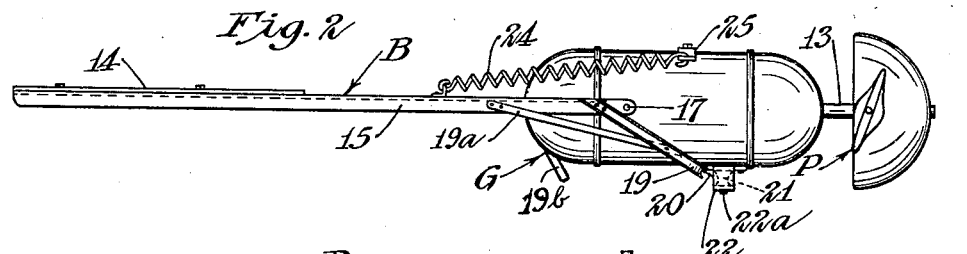
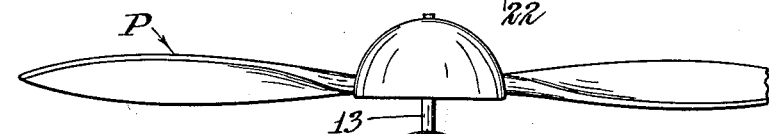
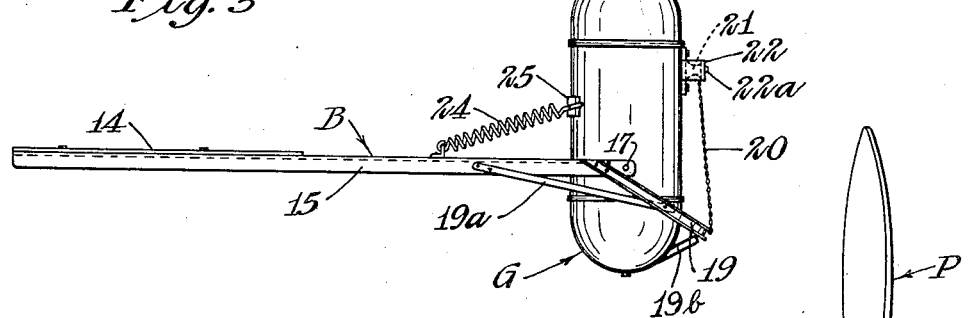
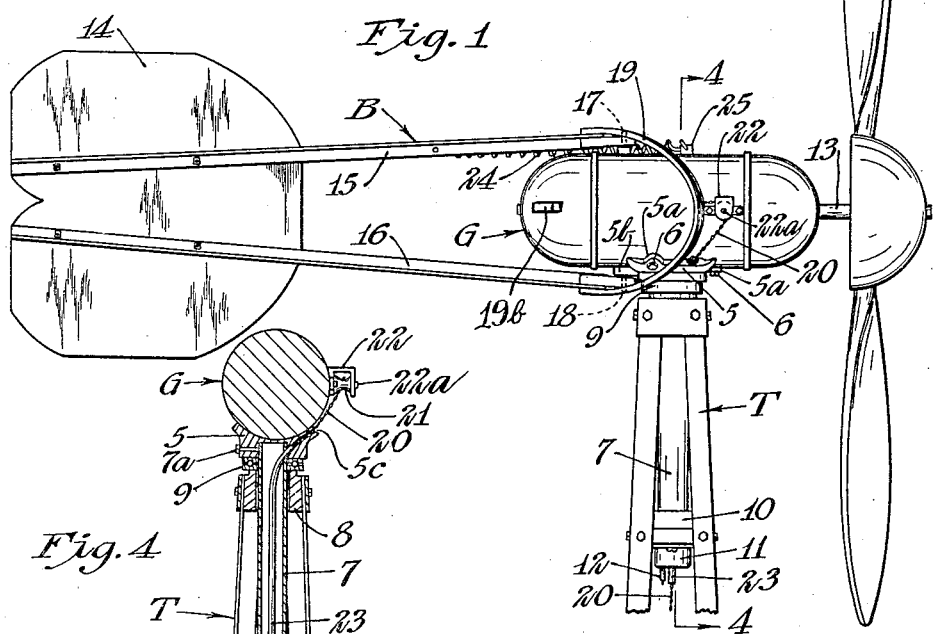
Inventor
Joseph H. Jacobs
By his Attorneys
Williamson & Williamson Patented Sept. 22, 1936

2,055,012

UNITED STATES PATENT OFFICE 2,055,012

WIND ELECTRIC PLANT

Joseph H. Jacobs, Minneapolis, Minn.

Application July 12, 1935, Serial No. 31,017

5 Claims. (Cl. 290—55)

My invention relates to wind-driven power plants and particularly to improvements in wind driven electric power generating plants.

The usual wind electric plant consists of a propeller-driven electric generator wherein the propeller is usually mounted on a tower for adjustive rotation to permit facing of the propeller into winds from different directions and wherein a vane is employed to normally keep the propeller facing into the wind. Control means is ordinarily provided in such plants for swinging the vane into and out of alignment with the rotational axis of the propeller to respectively start and stop the plant. This control means is in many cases so arranged that breakage of parts thereof will permit the plant to go into or remain in operation thus rendering repair of the control means difficult and hazardous.

An object of my invention is to provide an improved wind electric plant structure arranged so that breakage of the vane controlling means thereof will cause the plant to shut down.

Another object is to provide such a plant wherein the generator, vane and vane controlling means are of improved construction and are assembled in an improved combination.

A further object is to provide such a plant of simple, rugged, light, compact and inexpensive construction.

These and other objects and advantages of the invention will be more fully set forth in the following description made in connection with the accompanying drawing, in which:—

Fig. 1 is a side view of my wind electric plant with the parts thereof positioned for normal operation;

Fig. 2 is a top view;

Fig. 3 is a top view with the parts of the plant disposed in non-operating position, and Fig. 4 is a vertical sectional view taken along the line 4—4 of Fig. 1 as indicated by the arrows.

Referring to the drawing, T represents a support such as a tower or the like upon which wind driven apparatus may be mounted in an elevated location so as to receive the full benefit of any available currents of air.

An electrical generator G, which may be of conventional design, is mounted, with the axis of rotation of its revolving parts disposed horizontally, on the upper end of the tower T in such manner as to permit bodily rotation of the generator G about a vertical axis. To this end a generator saddle member 5, which may be in the form of a metal casting, is provided. The upper side of the saddle 5 is suitably shaped to conform to the contour of and receive the lower part of the central portion of the generator G. The generator G is placed upon the saddle 5 and is rigidly secured thereto by suitable means such as cap-screws 6 projecting through apertured lugs 5a formed on the saddle 5 into internally screw-threaded apertured portions of the frame of the generator G. A vertically disposed pivot member is secured to and projects downwardly from the bottom side of the saddle 5. As shown this pivot member consists of a tubular element or pipe 7 screwed into an internally screw-threaded recess in the lower portion of the saddle 5 and secured therein by appropriate means such as the set-screw 7a.

A body 8, secured to and comprised in the upper end portion of the tower T, is provided with a vertically disposed aperture in which the pivot pipe 7 is journaled and below which the pipe 7 extends through a substantial distance. A thrust bearing 9 is disposed between the saddle member 5 and the body 8 in encircling relation with the pipe 7 to provide anti-friction means for supporting the weight of the saddle member 5, pipe 7 and parts carried thereby.

A short distance above its lower end, the pipe 7 is journaled in a guide bearing 10 mounted in the tower T.

A casing 11 is disposed below and suitably secured to the guide bearing 10 and comprises a housing for means, such as slip rings and brushes, for providing electrical connections between wires 12 and other wires extending through the interior of the pipe 7 to the internal parts of the generator G.

A wind actuated prime mover, such as the propeller P, is mounted on the shaft 13 of the generator G to apply rotative mechanical power thereto for conversion by the generator G into electrical power.

The propeller driven generator described above is provided with a tail for normally maintaining the propeller in facing relation to the wind. A vane 14, preferably constructed of sheet material, is disposed radially outwardly of the longitudinal axis of the pipe 7 in a vertical plane and is secured to the outer portion of a boom B which extends horizontally outwardly from the generator G. The boom B consists of a pair of substantially horizontally disposed elongated members 15 and 16 of which the member 15 is located above the member 16 in spaced relation thereto. The inner end of the upper boom member 15 is pivotally mounted on a stud 17 which projects vertically upwardly from the top of the generator G and the inner end of the lower boom member 16 is pivotally mounted on a stud 18 which projects vertically downwardly from a lug 5b formed integrally with the saddle member 5. The studs 17 and 18 are in vertical axial alignment so that the tail comprising the vane 14 and boom B is free for swinging movement in a horizontal direction relative to the generator G.

Obviously, the vane 14 and boom B will always assume a position extending from the generator G in a direction opposite to the direction from which the wind is coming. Means is provided for swinging the generator G relative to the boom B between relative positions wherein the axis of rotation of the shaft 13 of the generator is respectively parallel and substantially at right angles to the boom B. A channel-shaped element is formed into a U-shaped member 19 and the free ends thereof are secured to the inner end portions of the respective boom members 15 and 16 in such manner that the U-shaped member 19 is disposed in a vertical plane at an obtuse angle to the boom B as best shown in Figs. 2 and 3. The U-shaped member 19 constitutes a shifting or operating arm by means of which the angle between the boom B and the rotational axis of the generator shaft 13 may be varied to swing the generator relative to the boom B. The member 19 because of its U-shape, is enabled to straddle the generator G instead of striking the same. Brace bars 19a extend between and are secured a'. respective ends to the operating arm 19 and the boom B, as shown, so as to insure the rigid relation of the operating arm 19 to the boom B.

One end of an elongated flexible element such as the chain 20 is connected to the operating arm 19 at the middle of the curved portion thereof. The chain 20 is trained over a sheave 21 revolubly mounted on the side of the generator by means of a bracket 22 and a pivot screw 22a as shown. From the sheave 21 the chain 20 extends through an aperture 5c in the saddle member 5 and then through a guide tube 23 which is disposed within the pipe 7, is secured at its upper end in the aperture 5c and depends at its lower end below the lower end of the pipe 7. The chain 20 is of sufficient length to depend a substantial distance below the lower end of the guide tube 23 so as to be readily accessible to an operator of the plant. It should be apparent that pulling on the depending lower portion of the chain 20 will swing the operating arm 19 and the sheave 21 toward each other to change the relation between the generator G and the boom B from that shown in Fig. 3 to that shown in Figs. 1 and 2 and thus bring the plant into operation. To change the relation between the generator G and the boom B to that shown in Fig. 3 and thus shut down the plant when the chain 20 is released or in case of the chain breaking, a helical tension spring 24 is connected at one end to the upper member 15 of the boom B and at the other end to a spring anchoring element 25 on the frame of the generator G as shown. Anchoring means (not shown), such as a common cleat or other suitable means, should be provided on the lower part of the tower T so that the depending lower portion of the chain 20 may be anchored thereon when it is desired to hold the chain 20 in downwardly pulled position to keep the plant in operation.

A stop member 19b is provided on the generator G, as shown, to engage the operating arm 19 as the boom B reaches a position approximately at right angles to the axis of the generator shaft 13. When the boom B is swung into operative relation with the generator the bracket 22 serves as a stop member and is engaged by the operating arm 19.

It is apparent that I have invented novel, simple, inexpensive and effective improvements in wind-electric generating plants.

It will, of course, be understood that various changes may be made in the form, details, proportions and arrangement of the parts without departing from the scope of my invention, which, generally stated, consists in a device capable of carrying out the objects above set forth and in the novel parts and combinations of parts disclosed and defined in the appended claims.

What is claimed is:

1. In a wind operated power producing plant, a body, a propeller mounted on said body for rotation about a substantially horizontal axis, a support for said body, said body being mounted on said support for rotation with respect thereto about a vertical axis, a vane-supporting boom comprising a pair of spaced elongated members disposed substantially horizontally and one above the other, a vane disposed in a vertical plane and secured to the outer portion of said boom, the inner ends of the upper and lower elongated members of said boom being respectively pivotally attached to the upper and lower portions of said body to provide for swinging of said boom in a horizontal plane relative to said body, a generally U-shaped member secured at its respective free ends to the inner portions of the respective elongated members and disposed at an angle thereto to form an operating arm straddling said body, yieldable means urging said boom toward a position at one angle relative to the rotational axis of said propeller and actuating means connected to the medial portion of said U-shaped member adapted for operation to actuate said U-shaped member to swing said boom into a second angular relation with said rotational axis.

2. In a wind operated electric generating plant, a supporting structure, a propeller driven generator mounted on said support for turning movement relative thereto in a substantially horizontal plane, a vane adapted to assume a position parallel to the wind direction, a pair of members forming the inner end of said vane and positioned one above the other, said members being pivotally connected to said generator to provide for turning of said generator relative to said vane, means for turning said generator between positions thereof extending substantially parallel and normal to said vane, and a U-shaped element secured at its inner end to the respective ones of said members and positioned to engage said generator when the same is in one of said positions.

3. The structure defined in claim 2 and a stop mounted on said generator in position to engage said U-shaped element when said generator is in the other of said positions.

4. The structure defined in claim 2 and a flexible elongated control element connected at one end to said U-shaped element, and guide means on said generator over which said flexible element passes and from which said flexible element extends downwardly whereby tension on the lower portion of said flexible element will pull said generator toward said one of said positions.

5. The structure defined in claim 2, and resilient means connected between points respectively on said vane and said generator for urging said generator toward one of said positions.

JOSEPH H. JACOBS.